(12) United States Patent
Popp et al.

(10) Patent No.: US 10,184,408 B2
(45) Date of Patent: Jan. 22, 2019

(54) DEVICE FOR CHANGING A COMPRESSION RATIO OF A CYLINDER UNIT OF A RECIPROCATING-PISTON INTERNAL COMBUSTION ENGINE

(71) Applicant: SCHAEFFLER TECHNOLOGIES AG & CO. KG, Herzogenaurach (DE)

(72) Inventors: Markus Popp, Frensdorf (DE); Andreas Moeller, Nuremberg (DE); Swen Doerrie, Herzogenaurach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 79 days.

(21) Appl. No.: 15/505,190

(22) PCT Filed: Jun. 16, 2015

(86) PCT No.: PCT/DE2015/200373
§ 371 (c)(1),
(2) Date: Feb. 20, 2017

(87) PCT Pub. No.: WO2016/026488
PCT Pub. Date: Feb. 25, 2016

(65) Prior Publication Data
US 2017/0276072 A1 Sep. 28, 2017

(30) Foreign Application Priority Data
Aug. 20, 2014 (DE) .................. 10 2014 216 531

(51) Int. Cl.
F02B 75/32 (2006.01)
F02D 15/02 (2006.01)
(Continued)

(52) U.S. Cl.
CPC ............ F02D 15/02 (2013.01); F02B 75/048 (2013.01); F16C 7/023 (2013.01); F16C 7/06 (2013.01); F16C 23/10 (2013.01); F16C 2360/22 (2013.01)

(58) Field of Classification Search
CPC ........ F02D 15/02; F02B 75/048; F16C 7/023; F16C 7/06; F16C 23/10; F16C 2360/22; H05K 999/99
(Continued)

(56) References Cited

U.S. PATENT DOCUMENTS 5,562,068 A 10/1996 Sugimoto
5,960,750 A 10/1999 Kreuter
(Continued)

FOREIGN PATENT DOCUMENTS

DE 19703948 C1 6/1998
DE 10213890 A1 10/2002
(Continued)

OTHER PUBLICATIONS

International Search Report for International Application No. PCT/DE2015/200373 dated Sep. 22, 2015.

Primary Examiner — Marguerite McMahon
(74) Attorney, Agent, or Firm — Brooks Kushman P.C.

(57) ABSTRACT

A device for changing a compression ratio of a cylinder unit of a reciprocating piston internal combustion engine has an eccentric bushing which is rotatably arranged in a bore of a connecting rod eye. Said eye encloses a crank pin of a crankshaft, and the bushing is rotatably guided in the bore and can be locked via locking openings, which are arranged to be offset from each other by preferably approximately 180°. The connecting rod has a locking apparatus which interacts optionally with the locking openings and via which the eccentric bushing can only ever be transferred from one (Continued)

position to the next. The locking apparatus has a sliding guideway extending parallel to the longitudinal axis of the bore of the connecting rod bearing eye. The sliding guide interacts with actuating pins arranged in the locking openings and can be displaced radially with respect to the bushing.

19 Claims, 2 Drawing Sheets

(51) Int. Cl.
    *F02B 75/04* (2006.01)
    *F16C 7/02* (2006.01)
    *F16C 7/06* (2006.01)
    *F16C 23/10* (2006.01)

(58) Field of Classification Search
    USPC ........................................................ 123/48 B
    See application file for complete search history.

(56) References Cited

U.S. PATENT DOCUMENTS

| | | | |
|---|---|---|---|
| 2003/0209219 A1* | 11/2003 | Klomp | F02B 75/045 123/197.4 |
| 2015/0260094 A1 | 9/2015 | Wittek | |

FOREIGN PATENT DOCUMENTS

| | | |
|---|---|---|
| DE | 102012020999 A1 | 1/2014 |
| EP | 1085185 A2 | 3/2001 |

\* cited by examiner

DEVICE FOR CHANGING A COMPRESSION RATIO OF A CYLINDER UNIT OF A RECIPROCATING-PISTON INTERNAL COMBUSTION ENGINE

CROSS-REFERENCE TO RELATED APPLICATIONS

This application is the U.S. National Phase of PCT Appln. No. PCT/DE2015/200373 filed Jun. 16, 2015, which claims priority to DE Patent Application No. 10 2014 216 531.8 filed Aug. 20, 2014, the disclosures of which are incorporated in their entirety by reference herein.

TECHNICAL FIELD

The invention relates to a device for changing a compression ratio of a cylinder unit of a reciprocating piston internal combustion engine, comprising an eccentric bushing which is rotatably arranged in a receiving bore hole of a connecting rod bearing eye of a connecting rod, said connecting rod bearing eye being formed by a connecting rod upper part and a connecting rod lower part, and which surrounds a crankpin of a crankshaft, whereby the eccentric bushing that is rotatably guided in the receiving bore hole is preferably lockable in two positions which are offset from one another by preferably approximately 180° in the circumferential direction of the eccentric bushing, and whereby a locking apparatus optionally interacting with the locking openings is arranged in the connecting rod lower part, through which the eccentric bush can be positively connected in the respective positions in the connecting rod bearing eye.

BACKGROUND

The compression ratio of a reciprocating piston internal combustion engine E is used to describe the ratio of the volume of the entire cylinder chamber to the volume of the compression chamber. Through an increase in the compression ratio, the efficiency of the reciprocating piston internal combustion engine may be increased and the fuel consumption my thus be reduced overall. With reciprocating piston internal combustion engines with external ignition, their knocking tendency however increases with the increase of the compression ratio in full-load operation. The knocking is an uncontrolled self-ignition of the air-fuel mixture. On the other hand, the compression ratio during partial-load operation, during which the filling is lower, could be increased for the improvement of the respective partial-load efficiency, without the previously mentioned knocking occurring. The result is thus that it is expedient to operate the reciprocating piston internal combustion engine in partial-load operation with a relatively high compression ratio and in full-load operation with a compression ratio reduced towards it.

A change of the compression ratio is also particularly advantageous for loaded reciprocating piston internal combustion engines with external ignition, as a lower compression ratio is stipulated with them in view of the load, whereby the compression must be increased to improve the thermodynamic efficiency in unfavorable areas of a respective engine map. There is furthermore the possibility to generally change the compression ratio depending on more operating parameters of the reciprocating piston internal combustion engine, for example like with running conditions of motor vehicles, operating points of the internal combustion engine, signals of a knock sensor, emission values, etc.

Devices are known from the state of the art, among other things, which perform an adjustment in distance between a crankpin, a crankshaft, and a piston pin. It thereby pertains to different devices, namely to such that are used to change the position of the piston as opposed to the connecting rod, or to such that perform a change in position of the connecting rod as opposed to the crankshaft.

A device for changing a compression ratio of a reciprocating piston internal combustion engine in the type described in the generic claim of patent claim 1 is known from DE 197 03 948 A1. According to that, a connecting rod divided in the area of its connecting rod bearing eye accommodates an eccentric bushing through the bore of the connecting rod bearing eye. It is guided to an inside wall of the connecting rod bearing eye with its cylindrical outer circumferential surface and is supposed to be formed as a plain bearing. On its inside circumferential surface that is eccentrically offset to the outer circumferential surface, the bushing is guided sliding on a crankpin of a crankshaft of the reciprocating piston internal combustion engine. A rotation of the bushing in the bore of the connecting rod bearing eye shall be automatic. This movement of the eccentric bushing shall be triggered by outside forces resulting from the rotation of the crankshaft, respectively the connecting rod movement. The eccentric bushing is furthermore provided with flanges on its ends, which overlap the connecting rod bearing eye and have locking recesses offset by 180° in peripheral direction. A locking member intended on the connecting rod is activated through a cam segment in such a way that it optionally engages in the one or the other locking recess after a respective twist of the bushing.

SUMMARY

It is the task of the present disclosure to improve the function of the locking element to ensure that the eccentric bushing can always be transferred from just one position into the next one.

Advantageous embodiments are portrayed in the patent claims, which in their own right, or used in different combinations, may represent an aspect of the invention together.

According to one embodiment, a locking device includes a sliding guideway running parallel to the longitudinal axis of the location hole of the connecting rod bearing eye, which interacts with actuating pins arranged in the locking openings that may be arranged radially to the eccentric bushing. These actuating pins that may be movable radially by means of the sliding guideway are arranged in the connecting rod lower part together with the sliding guideway. The two intended locking openings that are located on circumferential tracks distanced from each other are thereby offset by 180° to one another in peripheral direction of the eccentric bushing.

By contrast, a locking element formed as a hollow pin with closed fronts is intended according to DE 197 03 948 A1, which includes two compression springs supported on the fronts in its inside. A pivoting lever engages in the bushing between these compression springs with one approach. The expenditure to make such a locking unit is relatively high. The pivoting lever must also constantly be held in its locking position by means of the guideway so that it doesn't change its assumed position, and so that the locking element is thus disengaged. The unlocking, therefore the movement of the bushing from the locking opening is not done specifically either, so that a rotation of the eccentric bushing is possibly prevented. In contrast, the locking element per the invention is specifically moved into its positions and is locked into them.

In another embodiment of the invention, the locking openings are supposed to be intended in the connecting rod lower part and are supposed to be arranged on different circumferential tracks to the outer casing surface of the eccentric bushing, whereby radial blind holes of the eccentric bushing include tie pins preloaded outwards by means of springs, which align with a locking opening arranged on the respective circumferential track and the respective actuating pin depending on the position of the eccentric bushing, respectively interact with the ends of the actuating pins facing away from the tie pins.

In each of the two sliding positions, in which the respective actuating pin is moved into the remote area of the sliding guideway, the respective tie pin can exit and enter into the locking opening following the direction of rotation. In the middle area, the actuating pin is only moved to the radial parting plane between the eccentric bushing and the connecting rod bearing eye. Only low spring forces of the compression springs arranged between the tie pins and the bottom of the blind hole are thereby required, so that the eccentric bushing can be rotated relatively smoothly.

In this connection, provision is made to form the sliding guideway cylindrically, whereby it has reduced end areas in the diameter. The sliding guideway is consequently formed rotationally symmetric. There is furthermore naturally the possibility to guide any form of a sliding guideway in which a middle area moves the actuating pins radially outwards and reduced areas to the respective actuating pins to a movement of the actuating pins inwards.

There is furthermore the possibility to arrange a freewheel between an outer casing surface of the eccentric bushing and the hole of the connecting rod bearing eye. This freewheel prevents that the eccentric bushing is moved into opposite directions of rotation due to the mass or gas forces as well as moments created by the rotating crankpin in short rotary motions. A change of rotation may come about in the area of the upper or lower dead center of the working piston connected with the connecting rod, as moments that can assume both positive and negative values affect the eccentric bushing.

The consequence is that the respective eccentric bushing is not rotated into its other position serving the change of the compression ratio of the cylinder unit. This ultimately leads to that some of the cylinder units are operated with a high, and some with a low compression ratio. According to the invention, these disadvantages can be eliminated, by that the freewheel intended between the eccentric bushing and the connecting rod eye only allows for a specific rotation in one direction of rotation.

This freewheel can be formed as a roller freewheel with clamping rollers guided in a cage, whereby clamping ramps are formed on the outer casing surface of the eccentric bushing. The respective clamping rollers of this roller freewheel are formed cylindrically and work together with the clamping rollers. If the barrier effect is sufficient, then balls can also be intended as blocking elements instead of the cylindrical clamping rollers. Alternately to the use of a roller freewheel, there is also the possibility to provide for a clamping body freewheel, in which both the inside and the outside blocked surface would be formed cylindrically. The outer casing surface of the eccentric bushing must therefore not be equipped with clamping ramps as is the case with the roller freewheel.

There is furthermore the possibility to form the freewheel as a wrap-spring free wheel. An end of at least one wrap-spring can thereby be coupled to the connecting rod bearing eye, this end of the wrap-spring can be fixated in the parting plane between the connecting rod upper and lower part. The other end of the wrap-spring is slid onto the eccentric. It is thereby important that the helical running wrap-spring can be installed over the crankpin or the offset of the crankshaft. Provision is made here that the cross section of the wrap-spring is chosen so that the rectangular band is designed weaker in the direction to be bent upwards and can therefore be brought over the crankpin. Once the first winding has been slid over the crankpin, the remaining wrap-spring can thus be wound up on the crankpin. Compared to a positive locking or force locking freewheel, the wrap-spring has the advantage that the wrap-spring can assume a clearly higher overload.

According to this disclosure, the eccentric bushing can run essentially across its entire length within the hole. This formation and arrangement of the eccentric bushing is contrary to the solutions, in which the eccentric bushing protrudes on both sides of the connecting rod bearing eye and has sides.

Lastly, the eccentric bushing can comprise two half shells. These two half shells that can accommodate the freewheel on its outer casing surface, as described above, can therefore be installed on the crankpin together with the divided connecting rod bearing eye.

This disclosure is not restricted to the listed combination of features of the claims. There are furthermore more possibilities to combine individual features with each other, especially when they are the result of the patent claims, from the following description of the execution examples or from the figures directly. The reference of the patent claims to the figures shall not restrict the scope of protection of the patent claims due to the use of reference signs in any case either.

BRIEF DESCRIPTION OF THE DRAWINGS

For a further explanation of embodiments of the invention, the drawing is referred to representing several different execution examples in a simplified manner. The following is shown.

DETAILED DESCRIPTION

Figure 1:
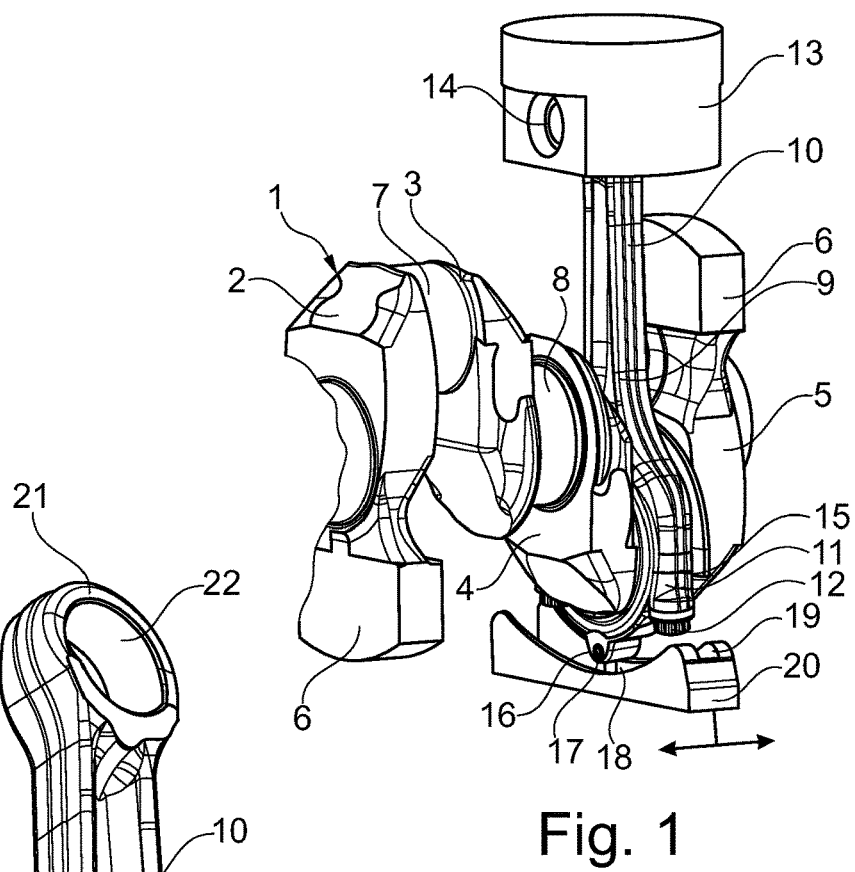
FIG. 1 as a perspective representation, a partial view of a crankshaft with a connecting rod arranged on a crankpin recording a working piston, which is cut in the area of its connecting rod lower part, FIG. 2 a perspective representation of a connecting rod per the invention, whose connecting rod lower part has a location hole for a sliding guideway and a slot to include a carrier, FIG. 3 a perspective representation of a connecting rod cut lengthwise, whereby a wrap-spring freewheel is arranged between a connecting rod eye and an eccentric bushing, and FIG. 4 an enlarged representation of the connecting rod bearing eye from FIG. 3.

A crankshaft of a reciprocating piston internal combustion engine is designated 1 in FIG. 1, of which only one partial section is represented consisting of four crank webs 2, 3, 4, and 5. The crank webs 2 and 5 are thereby provided with counterweights 6 for mass balance and insofar differ from the crank webs 3 and 4. A crankpin 7 is furthermore formed between the crank webs 2 and 3 for the inclusion of a connecting rod not explained in detail, while the crank webs 3 and 4 run on both sides of a main bearing pin 8, above which the crankshaft 1 is stored in a crankcase of the reciprocating piston internal combustion engine not explained in detail. Finally, a crankpin is intended again between the two crank webs 4 and 5, which is however not visible in this representation as a connecting rod 9 is arranged on it. Due to the offset of the crankshaft 1, this non-visible crankpin assumes a different position compared to the crankpin 7.

This connecting rod 9 consists of a connecting rod upper part 10 and a connecting rod lower part 11 that are connected with each other by screws 12. The connecting rod upper part 10 includes a working piston 13 on its end facing away from the connecting rod lower part 11, which is attached to the connecting rod upper part 10 by means of a piston pin 14 with a piston pin bearing not explained in detail as well as a connecting rod eye. A parting plane 15 between the connecting rod upper part 10 and the connecting rod bottom part 11 runs through a connecting rod bearing eye that is also not visible in the perspective representation of FIG. 1, as already stated, as the connecting rod 9 is installed on the respective crankpin of the crankshaft 1.

An eccentric bushing is arranged in this connecting rod bearing eye that will still be described in detail in connection with the following figures. A location hole 16 is provided for in the connecting rod lower part 11, which houses or includes a sliding guideway 17. This sliding guideway 17 comprises a radial carrier 18, which engages in a carrier groove 19 of a cam disc 20 at times, meaning in the area of a bottom dead center of the working piston 13. This cam disc 20 arranged in an oil sump of the reciprocating piston internal combustion engine is arranged moveable in longitudinal direction of the crankshaft 1 and is moved accordingly by means of adjusting means not described in more detail. It can thus move the sliding guideway 17 into the two respective directions through its carrier groove 19 accommodating the carrier 18. The carrier groove 19 can be widened in the inlet area for the carrier 18 and can taper off continuously to the discharge area to offset possible tolerances.

Figure 2:
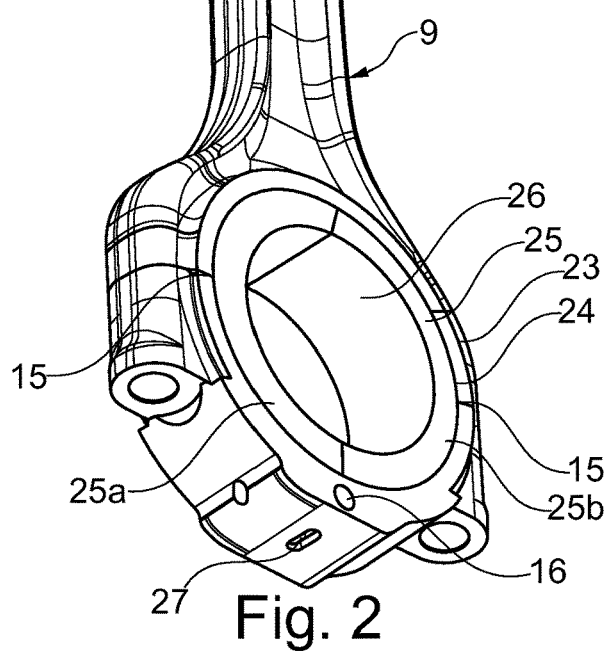

FIG. 2 shows the formation of the connecting rod 9 that is however represented without the previously listed sliding guideway 17 and without the carrier in this case. The previously mentioned connecting rod eye is thereby described with 21, which houses or includes a piston pin bearing 22. There is a connecting rod bearing eye 23 on the other end of the connecting rod that is formed by the connecting rod upper part 10 and the connecting rod lower part 11. The connecting rod bearing eye 23 has a bore, in which an eccentric bushing 25 is guided rotationally, and which consists of half shells 25a and 25b.

This eccentric bushing 25 is provided with a plain bearing layer 26 on its inner casing surface and serves as a storage for a crankpin in the connecting rod bearing eye 23. Due to the eccentricity of the eccentric bushing 25, its rotations has the effect that the connection point of the connecting rod is moved on the crankshaft 1 and that the compression ratio thus changes. The location hole 16 for a sliding guideway described further below runs in parallel to the bore 24. A slot 27 is furthermore located in the connecting rod lower part 11 to accommodate the carrier 18 already shown in FIG. 1.

Figure 3:
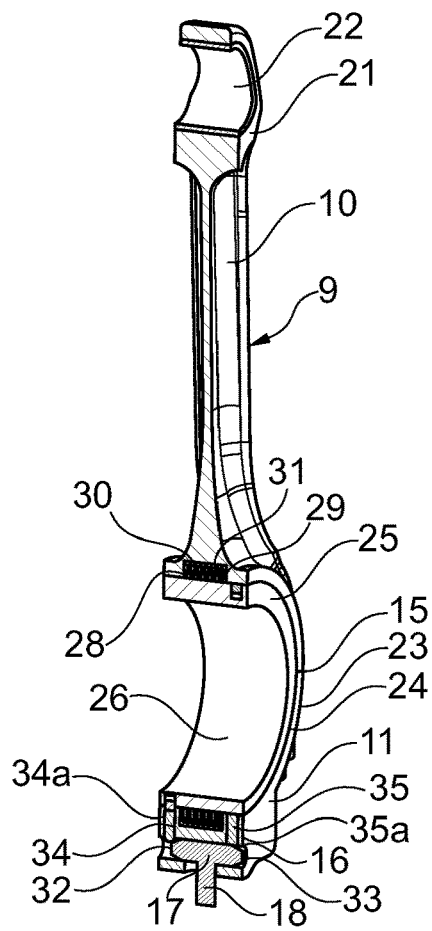
Figure 4:
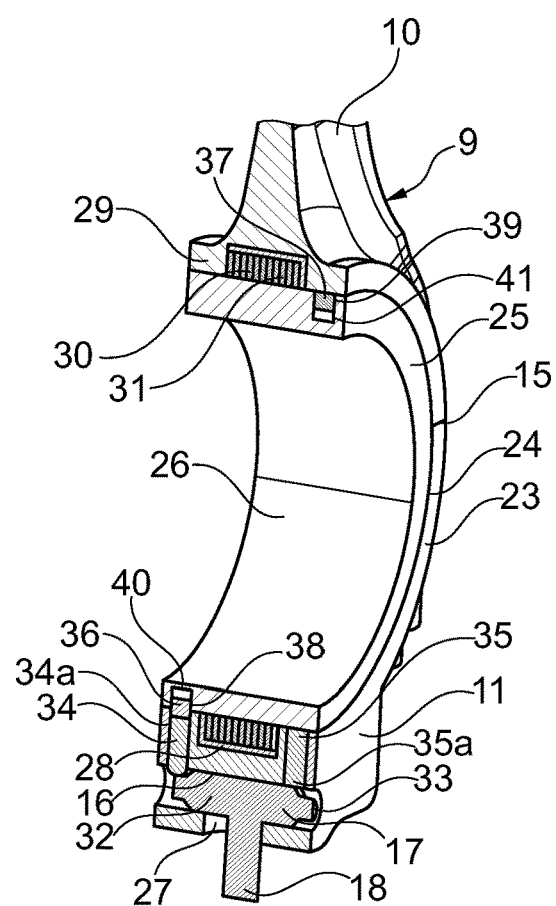

According to FIGS. 3 and 4 both the connecting rod upper part 10 and the connecting rod lower part 11 are provided with a recess 28 with a rectangular cross section in the area of the bore 24, which consequently surrounds the eccentric bushing 25 on an outer casing surface 29. As can furthermore be seen from these figures, a wrap-spring freewheel 30 is arranged within this recess 28, which thus wraps the eccentric bushing 25 on its outer casing surface 29. A respective wrap-spring 31 is thereby fixated on the connecting rod bearing eye 49 on its one end. A respective wrap-spring freewheel 54 enables a rotation of the eccentric bushing 25 in one direction of rotation across from the connecting rod bearing eye 23 and prevents a rotation in the other direction of rotation. The eccentric bushing 25 is formed hollow cylindrical overall in this case, therefore without a rib.

The sliding guideway 17 is arranged in the location hole 16, which runs parallel to the bore of the connecting rod bearing eye 23 in the connecting rod lower part 11. The sliding guideway 17 has end sections 31 and 32, in which it is furnished with a recess or a reduced diameter. Actuating pins 34 and 35 are furthermore provided in the bottom part of the piston 11, which run radially to the sliding guideway 17.

These actuating pins 34 and 35 can work together with tie pins 36 and 37, which are arranged in radial lock holes 38 and 39 of the eccentric bushing 25. The lock holes 38 and 39 are thereby located on circumferential tracks—which are offset to each other axially—of the eccentric bushing 25, and the tie pins 36 and 37 are supported in them by means of compression springs 40 and 41. The sliding guideway 17 comprises the carrier running towards it at a right angle, which, as is portrayed in FIG. 1, is activated through the cam disc 20 that is movable in axial direction in the two directions of movement of the sliding guideway 17.

When the sliding guideway 17 assumes a position, in which the respective actuating pin 34 or 35 immerses in one of the end sections 32 or 33, therefore moves outwards radially, then the respective tie pin 36 or 37 can exit from the lock hole 38 or 39 under pretension of the compression spring 40 or 41 and can consequently engage in the locking opening 34a or 35a in such a manner that the eccentric bushing 25 is locked across from the connecting rod bearing eye. According to FIGS. 3 and 4, this is the case for the tie pin 36 exiting from the lock hole 38.

LIST OF REFERENCE SIGNS

1 Crankshaft
2 Crank web
3 Crank web
4 Crank web
5 Crank web
6 Counterweight
7 Crankpin
8 Main bearing pin
9. Connecting rod
10 Connecting rod upper part
11 Connecting rod lower part
12 Screw
13 Working piston
14 Piston pin
15 Parting plane
16 Location hole
17 Sliding guideway
18 Carrier
19 Carrier groove
20 Cam disk
21 Connecting rod eye
22 Piston pin bearings
23 Connecting rod bearing eye
24 Bore
25 Eccentric bushing
25a Half shell of 25

25b Half shell of 25
26 Plain bearing layer
27 Slot
28 Recess
29 Outer casing surface of 25
30 Wrap-spring freewheel
31 Wrap-spring
32 End section of 17
33 End section of 17
34 Actuating pin
34a Locking opening
35 Actuating pin
35a Locking opening
36 Tie pin
37 Tie pin
38 Lock hole
39 Lock hole
40 Compression spring
41 Compression spring

The invention claimed is:

1. A device for changing a compression ratio of a cylinder unit of a reciprocating piston internal combustion engine, comprising:
an eccentric bushing rotatably arranged in a receiving bore hole of a connecting rod bearing eye of a connecting rod upper part and a connecting rod lower part, the eccentric bushing surrounding a crankpin of a crankshaft wherein the eccentric bushing is rotatably guided in the receiving bore hole and can be locked via locking devices disposed in locking openings located in positions which are offset from one another about the eccentric bushing, and wherein the eccentric bushing is positively fixable in the respective positions in the connecting rod bearing eye, wherein the locking device has a sliding guideway parallel to a longitudinal axis of the bore hole of the connecting rod bearing eye and the locking devices interacts with actuating pins arranged in the locking openings and movable radially relative to the eccentric bushing.

2. The device of claim 1, wherein the locking openings are provided in the connecting rod lower part and are arranged on different circumferential tracks to the outer casing surface of the eccentric bush and radial lock holes of the eccentric bush accommodate tie pins that are radially pre-stressed outwards by compression springs, which align with the locking openings and are arranged on a respective circumferential track depending on the position of the eccentric bushing as well as the respective actuating pin, and wherein the sliding guideway is movable lengthwise in the connecting rod lower part and interacts with ends of the actuating pins facing away from the eccentric bushing.

3. The device of claim 2, wherein the sliding guideway comprises end sections that are offset.

4. The device of claim 3, wherein the sliding guideway is formed cylindrically and comprises end sections that are reduced in diameter.

5. The device of claim 1, wherein a freewheel is arranged between an outer casing surface of the eccentric bushing and the bore hole.

6. The device of claim 5, wherein the freewheel is formed as a roller freewheel with clamping rollers guided in a cage, wherein clamping ramps are formed on the outer casing surface of the eccentric bushing.

7. The device of claim 5, wherein the freewheel is formed as a wrap-spring freewheel.

8. The device of claim 1, wherein the eccentric bushing substantially runs across its entire length within the bore hole.

9. The device of claim 1, wherein the eccentric bushing comprises two half shells.

10. The device of claim 1, wherein the locking openings are located 180 degrees from one another about the eccentric bushing.

11. A connecting rod configured to selectively change a compression ratio of an internal combustion engine, the connecting rod comprising:
an upper part and a lower part assembled together to define a bore hole, wherein the lower part defines a radially extending locking opening;
an eccentric bushing rotatably supported within the bore hole, the bushing defining a radially-extending lock hole;
a first pin slideably disposed in the lock hole of the eccentric bushing; and
a second slideably disposed within the locking opening and configured to selectively engage the second pin to inhibit rotation of the bushing with respect to the bore hole.

12. The connecting rod of claim 11, wherein the lower part defines a location hole extending parallel to a central axis of the bore hole, and a guideway is located and slideable within the location hole.

13. The connecting rod of claim 12, wherein the guideway selectively engages the second pin and forces the second pin along the lock opening to lock the bushing to the at least one of the upper part and lower part.

14. The connecting rod of claim 12, wherein the guideway includes a carrier extending radially therefrom, the carrier being selectively engagable within a groove of a cam disc when a piston connected to the connecting rod is located at a bottom dead center position.

15. The connecting rod of claim 14, wherein the carrier contacts the cam disk to longitudinally slide the guideway within the location hole and into engagement with the second pin to lock the bushing.

16. The connecting rod of claim 12, wherein the guideway includes two end regions on either side of a central region, wherein the end regions have a smaller diameter than the central region.

17. The connecting rod of claim 11, further comprising a spring in the lock hole of the eccentric bushing to bias the first pin away from the bore hole.

18. The connecting rod of claim 11, further comprising a freewheel arranged radially between an outer surface of the eccentric bushing and an inner surface of the bore hole.

19. A connecting rod configured to selectively change a compression ratio of an internal combustion engine, the connecting rod comprising:
a cylindrical surface defining a bore hole configured to attach to a crankshaft, the cylindrical surface defining a first radially extending opening;
an eccentric bushing rotatably supported within the bore hole, the bushing defining a second radially extending opening aligned with the first radially extending opening to define a common opening;
one or more pins slidably disposed within the common opening;
wherein the connecting rod defines a third opening extending parallel to a central axis of the bore hole; and
a guideway slidably disposed in the third opening and configured to selectively engage the one or more pins to press the one or more pins toward the bushing to lock the bushing with respect to the bore hole.

* * * * *